(12) United States Patent
Nelsen

(10) Patent No.: US 10,389,553 B2
(45) Date of Patent: Aug. 20, 2019

(54) COMMUNICATION BRIDGE BETWEEN BUS NETWORKS

(71) Applicant: Eaton Corporation, Cleveland, OH (US)

(72) Inventor: David Mark Nelsen, Mequon, WI (US)

(73) Assignee: Eaton Intelligent Power Limited, Dublin (IE)

( * ) Notice: Subject to any disclaimer, the term of this patent is extended or adjusted under 35 U.S.C. 154(b) by 1102 days.

(21) Appl. No.: 14/065,664

(22) Filed: Oct. 29, 2013

(65) Prior Publication Data
US 2015/0117463 A1  Apr. 30, 2015

(51) Int. Cl.
*H04L 12/46* (2006.01)
*H04L 29/08* (2006.01)

(52) U.S. Cl.
CPC .......... *H04L 12/4625* (2013.01); *H04L 67/12* (2013.01)

(58) Field of Classification Search
CPC ............... H04L 61/106; H04L 12/4625; H04L 12/40091; H04L 67/12; H04L 69/08
See application file for complete search history.

(56) References Cited

U.S. PATENT DOCUMENTS

| 7,532,640 B2 | 5/2009 | Kelly et al. | |
|---|---|---|---|
| 2008/0304499 A1* | 12/2008 | Jeon | H04L 12/66 370/401 |
| 2013/0070783 A1* | 3/2013 | Vermeulen | H04L 47/50 370/458 |
| 2013/0279500 A1* | 10/2013 | Yousefi | H04N 7/183 370/355 |

FOREIGN PATENT DOCUMENTS

KR    101094812 B1    12/2011

* cited by examiner

*Primary Examiner* — Jianye Wu
(74) *Attorney, Agent, or Firm* — Ziolkowski Patent Solutions Group, SC

(57) ABSTRACT

A communication bridge includes interfaces to interact with first and second communication networks and drivers to operate the first and second interfaces. A first internal memory of the communication bridge contains addresses of devices using the first communication network and a second internal memory contains addresses of devices using the second communication network. First and second master application processors in the communication bridge and are in operable communication with respective interfaces and internal memories. The first master application processor associates an address of a message received from a device on the first communication network with the address of a device on the second communication network to enable transmission of the message thereto. The second master application processor associates an address of a message received from a device on the second communication network with the address of a device on the first communication network to enable transmission of the message thereto.

11 Claims, 3 Drawing Sheets

COMMUNICATION BRIDGE BETWEEN BUS NETWORKS

BACKGROUND OF THE INVENTION

Embodiments of the invention relate generally to on-board computer networks in a motor vehicle, and more particularly a communication bridge to facilitate direct and transparent communication between differing protocols.

Modern motor vehicles, such as long haul semi-trailer trucks, incorporate computer systems, such as engine control, transmission operation, logging driver data, maintenance information, and occupant comfort systems. The various modules are connected to a communication network that runs throughout the truck for the exchange of data and commands. Common networking protocols include Controller Area Network (CAN), Local Interconnect Network (LIN), and others.

On-board modules use the communication network to communicate with other on-board modules to perform various functions related to the operation of the motor vehicle. For example, display modules may receive sensor data from an engine control module via a J1939/CAN data link, while another control module may provide data to another module via a LIN data link.

Problems may arise when vehicle components use different networking protocols. For example, a LIN bus hardware transceiver cannot be connected directly to a CAN bus hardware transceiver. The potential for such problems increases as the number of data links increases on a given motor vehicle. The inability to translate and communicate among and between protocols may impose significant limitations on the design and configuration of motor vehicles and modules.

To address these problems, conventional systems may incorporate various interface devices to facilitate communication between different types of data links. Although this solution may be functionally acceptable in some instances, their implementations are restricted due to the hardware and service capabilities associated with the types of data links used in a motor vehicle. Further, the additional hardware may take up valuable space needed for other components used by the motor vehicle.

Therefore, it would be desirable to provide a communication bridge consistent with certain embodiments of the present invention to facilitate direct and transparent communication between different types of network data links and protocols.

BRIEF DESCRIPTION OF THE INVENTION

In accordance with one aspect of the invention, communication bridge includes a first interface configured to interact with a first communication network that uses a first protocol, a second interface configured to interact with a second communication network that uses a second protocol, a first driver configured to operate the first interface, and a second driver configured to operate the second interface. The communication bridge further includes a first internal memory containing an address of each of one or more devices using the first communication network and a second internal memory containing an address of each of one or more devices using the second communication network. In addition, the communication bridge includes a first master application processor in operable communication with the first interface and the first internal memory and a second master application processor in operable communication with the second interface and the second internal memory. Further, when a message is received from a device on the first communication network for transmission to the second communication network, the first master application processor is programmed to associate the address of the device on the first communication network from which the message was received with the address of a device on the second communication network, so as to enable transmission of the message thereto. Moreover, when a message is received from a device on the second communication network for transmission to the first communication network, the second master application processor is programmed to associate the address of the device on the second communication network from which the message was received with the address of a device on the first communication network, so as to enable transmission of the message thereto.

In accordance with another aspect of the invention, a method for communicating between differing protocols includes receiving a first message at a communication bridge from a first address in a first communication network, the first address being associated with a device on the first communication network and changing the format of a data package from the first message from a first format of the first communication network to a bridge format of the communication bridge. The method further includes associating the first address of the first communication network with a second address in a second communication network, the second address being associated with a device on the second communication network. In addition, the method includes changing the format of the data package from the bridge format of the communication bridge to a second format of the second communication network and sending a second message with the data package to the second address of the second communication network using the second format.

In accordance with yet another aspect of the invention, a motor vehicle computer network system includes one or more modules connected to a first communication bus and using a first network protocol and one or more modules connected to a second communication bus and using a second network protocol, wherein the second network protocol is different than the first network protocol. In addition, the motor vehicle computer network system has a master bridge. The master bridge includes a first interface to interact with the one or more modules using the first network protocol, a second interface to interact with the one or more modules using the second network protocol, and one or more processors and associated memory devices in communication with the first and second interfaces. The one or more processors are programmed to receive a message from a module connected to one of the first communication bus or the second communication bus (the message including address information and a data package), determine an address of a module connected to the one of the first communication bus or the second communication bus from which the message was received, associate the address of the module from which the message was received to an address of a module connected to the other of the first communication bus or the second communication bus to which to send the data package in the received message, and transmit the data package from the received message to the determined address of the module connected to the other of the first communication bus or the second communication bus.

These and other advantages and features will be more readily understood from the following detailed description of preferred embodiments of the invention that is provided in connection with the accompanying drawings.

BRIEF DESCRIPTION OF THE DRAWINGS

The drawings illustrate one preferred embodiment presently contemplated for carrying out the invention.

In the drawings.

DETAILED DESCRIPTION

Embodiments of the present invention provide for a communication bridge between modules of a motor vehicle using differing protocols, for example, a Controller Area Network (CAN) protocol and a Local Interconnect Network (LIN) protocol.

Figure 1:
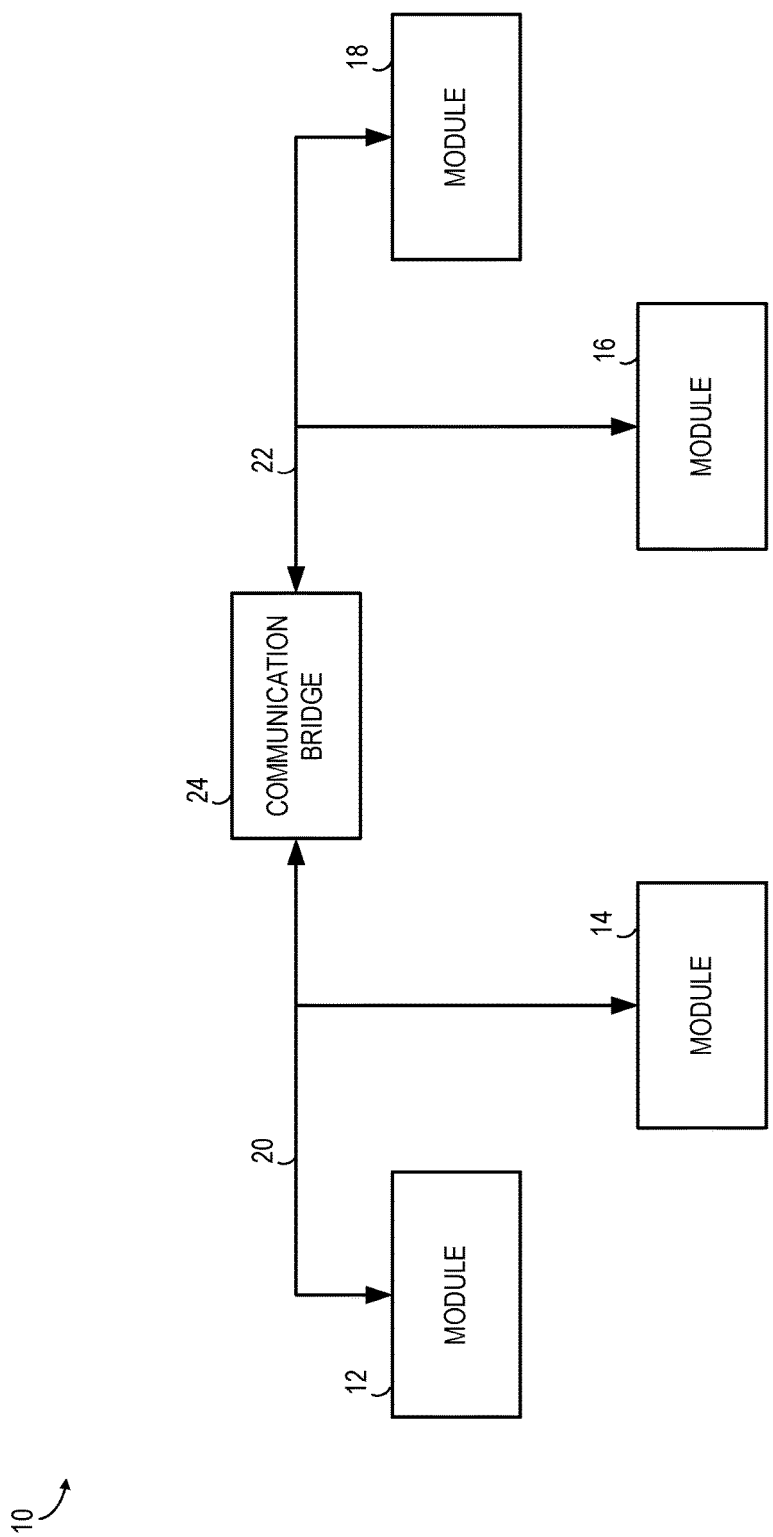
FIG. 1 is a block schematic diagram of a motor vehicle computer network system, according to an embodiment of the invention.

Referring first to FIG. 1, a motor vehicle computer network system 10 is illustrated according to an embodiment of the invention. Motor vehicle system 10 includes modules 12, 14, 16, 18. As shown in FIG. 1, modules 12, 14 are in communication with a first network protocol 20, and modules 16, 18 are in communication with a second network protocol 22. In one embodiment of the invention, first network protocol 20 is a CAN protocol, and second network protocol 22 is a LIN protocol. However, it is contemplated that first network protocol 20 and second network protocol 22 can be other known bus network protocols, as long as they are each different bus network protocols. Meanwhile, master communication bridge 24 is in communication with both first network protocol 20 and second network protocol 22.

Although FIG. 1 only depicts four (4) modules 12, 14, 16, 18, one skilled in the art will appreciate that embodiments of the invention may have more or less modules than shown in FIG. 1. Further, while it is depicted in FIG. 1 that both the first network protocol 20 and the second network protocol 22 contain two (2) modules, 12, 14 and 16, 18 respectively, it is contemplated that the first network protocol 20 may be in communication with more modules than the second network protocol 22, and vice versa.

Figure 2:
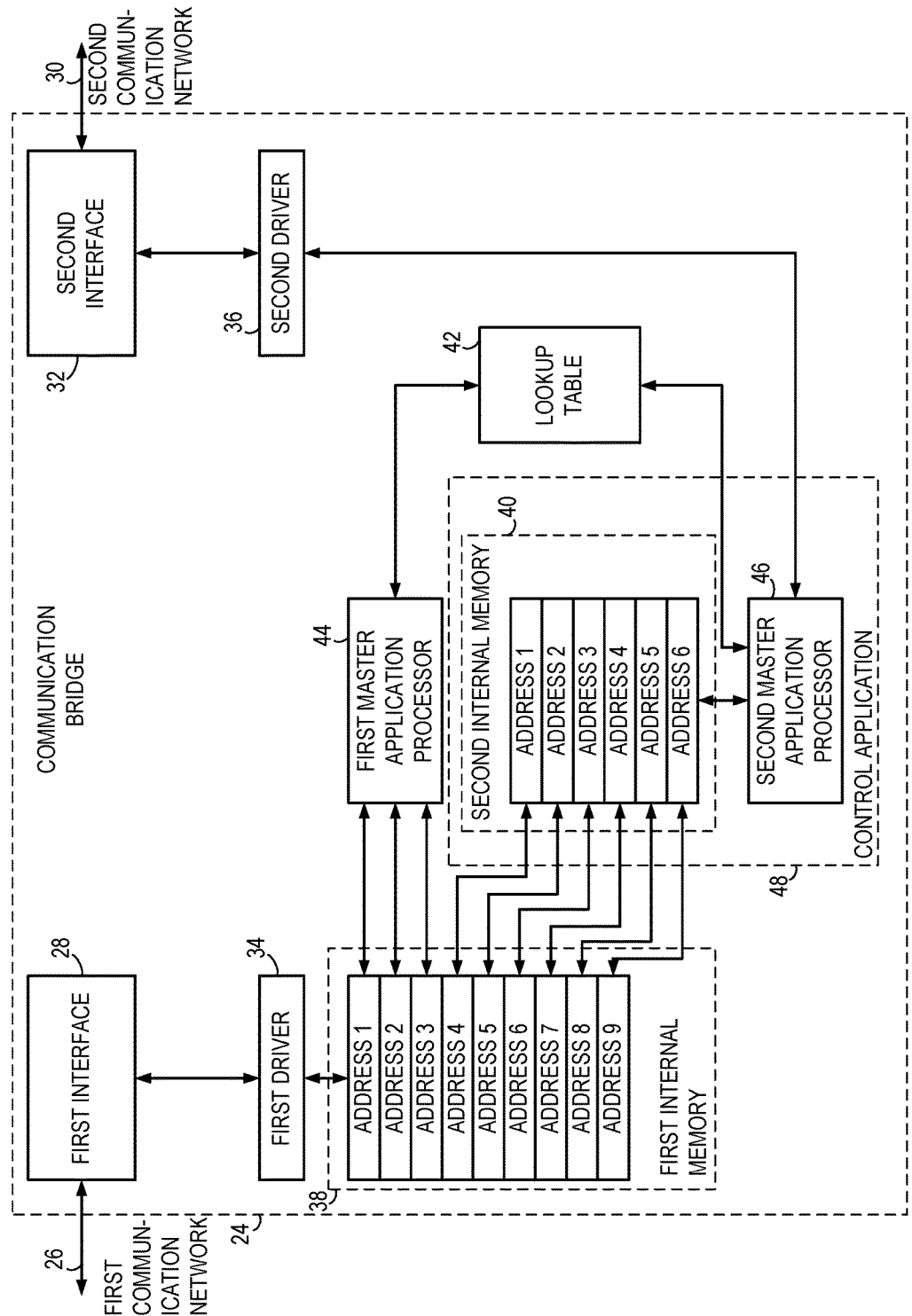
FIG. 2 is a block schematic diagram of a master communication bridge from FIG. 1, according to an embodiment of the invention.

FIG. 2 illustrates master communication bridge 24 of FIG. 1 in greater detail. As seen in FIG. 2, a first communication network 26 interacts with a first interface 28 of the master communication bridge 24, such that one or more modules on the first communication network 24—such as modules 12, 14 of FIG. 1, for example—can communicate with the bridge. First interface 28 either receives a message from first communication network 26 or sends a message to first communication network 26. When receiving a message from first communication network 26, first interface 28 converts the data of the message from a first format used by first communication network 26 to a bridge format used by master communication bridge 24. When sending a message to first communication network 26, first interface 28 converts the data of the message from the bridge format used by master communication bridge 24 to the first format used by first communication network 26.

In addition, a second communication network 30 interacts with a second interface 32 of the master communication bridge 24, such that one or more modules on the second communication network 30—such as modules 16, 18 of FIG. 1, for example—can communicate with the bridge. Similar to first interface 28, second interface 32 either receives a message from second communication network 30 or sends a message to second communication network 30. When receiving a message from second communication network 30, second interface 32 converts the data of the message from a second format used by second communication network 30 to the bridge format used by master communication bridge 24. When sending a message to second communication network 30, second interface 32 converts the data of the message from the bridge format used by master communication bridge 24 to the second format used by second communication network 30.

As further shown in FIG. 2, communication bridge 24 also includes a first driver 34 and a second driver 36 that operate the first interface 28 and second interface 32, respectively. Further, communication bridge 24 contains a first internal memory 38 that contains the individual addresses of each module or device contained on the first communication network 26. First internal memory 38 is linked with a second internal memory 40, with the second internal memory 40 containing the individual addresses of each module or device contained on the second communication network 30. While FIG. 2 shows first internal memory 38 having nine (9) addresses allocated thereto for modules/devices contained on the first communication network 26 and second internal memory 40 having six (6) addresses allocated thereto for modules/devices contained on the second communication network 30, it is recognized that the number of addresses in the first and second internal memories 38, 40 can vary.

According to one embodiment of the invention, first communication network 26 is a CAN network and first internal memory 38 contains the addresses of CAN modules and devices; meanwhile, second communication network 30 is a LIN network and second internal memory 40 contains the addresses of LIN modules and devices. In this instance, address messages from first communication network 26 are used to set up the associations between addresses located in first internal memory 38 and second internal memory 40, which may be referenced via a lookup table 42. These address messages contain the information regarding the addresses of modules and devices on first communication network 26 and the associated addresses of modules and devices on second communication network 30. While this embodiment defines first communication network 26 as a CAN network and second communication network 30 as a LIN network, one having skill in the art would recognize that in alternative embodiments first communication network 26 could be a network protocol other than CAN and the second communication network 30 could be network protocol other than LIN.

Also included in communication bridge 24 is a first master application processor 44 and a second master application processor 46, as further shown in FIG. 2. According to an embodiment of the invention, both the first master application processor 44 and second master application processor 46 are programmed to run software to perform the steps necessary to associate the addresses in first internal memory 38 with the addresses in second internal memory 40. According to an exemplary embodiment of the invention, the first master application processor 44 and second master application processor 46 associate the addresses in the first internal memory 38 with the addresses in the second internal memory 40 by accessing lookup table 42.

While there are two (2) master application processors 44, 46 depicted in FIG. 2, it is contemplated that the communication bridge 24 could contain more or less than two (2) master application processors 44, 46. In one embodiment of the invention, second internal memory 40 and second master application processor 46 are both located within a control application 48. In this instance, master control application 48 is programmed to run software to control the operation of second internal memory 40 and second master application processor 46.

In operation, the communication bridge 24 as described above allows for a transparent and direct communication between the modules and devices on first communication network 26 and the modules and devices on second communication network 30. When master communication bridge 24 receives a message from either first communication network 26 or second communication network 30, first and second master application processors 44, 46 are able to use the addresses stored in first internal memory 38, the address stored in second internal memory 40, and lookup table 42 to determine where to immediately send the message. In this aspect, master communication bridge 24 does not need to know the capabilities of the modules or devices, and modules or devices on first communication network 26 and second communication network 30 can communicate directly.

Figure 3:
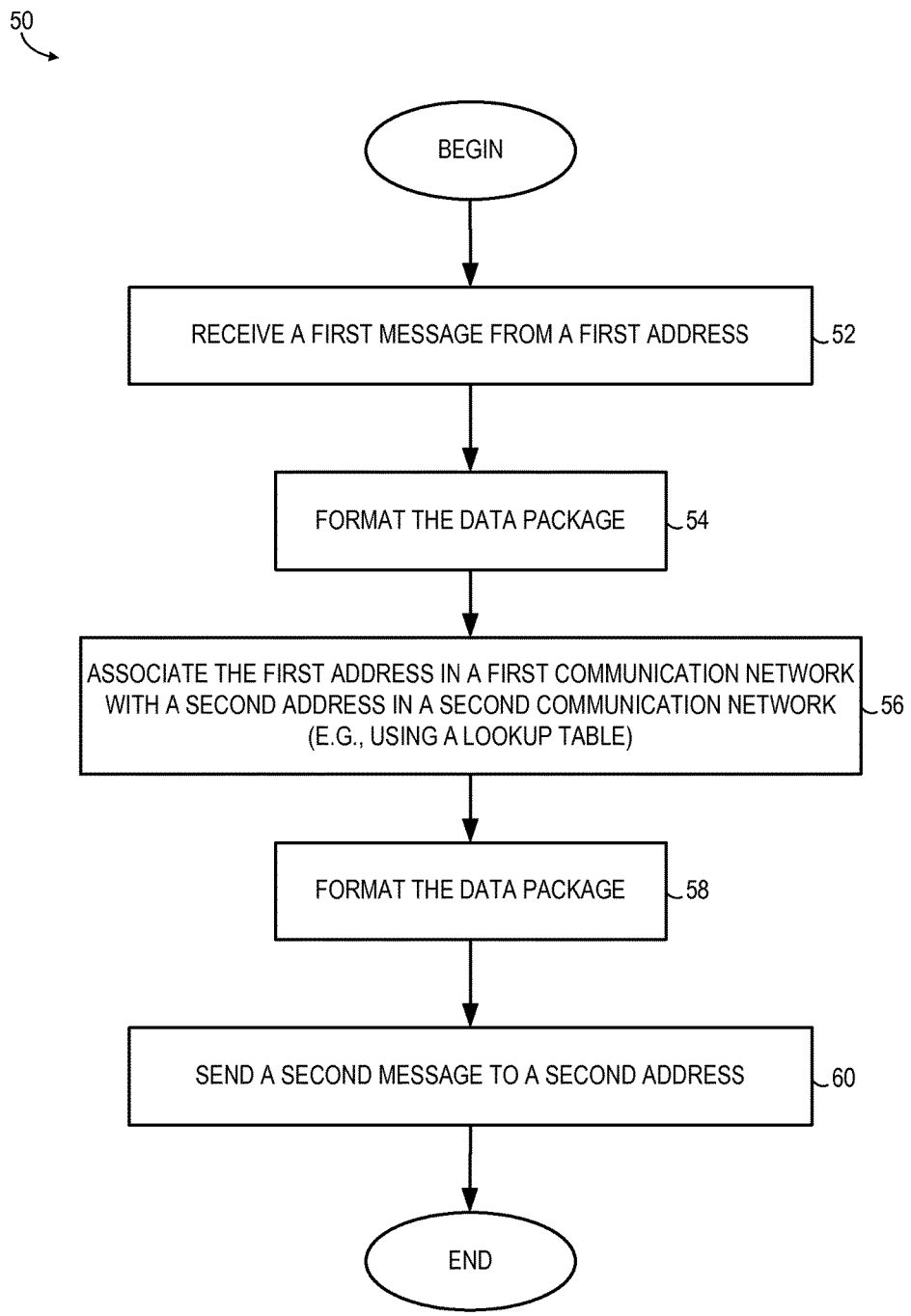
FIG. 3 is a flowchart of an exemplary communication method, according to an embodiment of the invention.

Referring now to FIG. 3, and with continued reference to FIG. 2, a flowchart of an exemplary method 50 for enabling communication between modules having differing communication protocols—such as a CAN protocol and LIN protocol—is shown according to an embodiment of the invention. The method 50 includes a series of steps 52, 54, 56, 58, 60 that enable such communication between different types of modules and protocols in a direct and transparent manner, with a master communication bridge—such as bridge 24—being employed for enabling such communication. During step 52, either first interface 28 or second interface 32 of bridge 24 receives a first message from a module or device located at a first address. If the message is received by first interface 28, the module or device is located at an address on first communication network 26; whereas, if the message is received by second interface 32, the module or device is located at an address on second communication network 30. In step 54, the message is reformatted to the data format used by the communication bridge 24. If the message was received by the first interface 28, the initial format of the data package is that of the first communication network 26; whereas, if the message was received by the second interface 32, the initial format of the data package is that of the second communication network 30. In either case, step 54 converts the data package from the message to the format used by the master communication bridge 24.

In step 56, communication bridge 24 associates a first address of the message, (the origin address) with a second address (the destination address). If the message originated in the first communication network 26, the first address is stored on the first internal memory 38 and the associated second address is stored on the second internal memory 40. While, if the message originated in the second communication network 30, the first address is stored on the second internal memory 40 and the associated second address is stored on the first internal memory 38. As stated previously, in one embodiment of the invention, the initial association between the addresses stored on the first internal memory 38 and addresses stored on the second internal memory 40 is set up by a message originating from the communication network that uses a CAN protocol. Further, the associations between the origin address and the destination address of a message may be referenced via lookup table 42.

Next, step 58 involves reformatting the data package from the original message. At this step, the data package will be formatted to the bridge format. If the message destination is a module or device on the first communication network 26, the data package is reformatted to a format consistent with the first communication network 26. However, if the message destination is a module or device on the second communication network 30, the data package is reformatted to a format consistent with the second communication network 30. Step 60 then sends the formatted message to a module or device located at a second address. If the message is sent from the first interface 28, the second address is located on the first communication network 26; whereas, if the message is sent from the second interface 32, the second address is located on the second communication network 30.

As demonstrated by FIG. 3, the message may be sent from either the first communication network 26 to the second communication network 30, or vice versa. This allows CAN modules and LIN modules in the motor vehicle to both directly send messages to and receive messages from each other.

In summary, the design of the communication bridge described herein allows for direct communication between modules using differing data links and protocols, while using minimal space.

A technical contribution for the disclosed method and apparatus is that it provides for a computer implemented technique for enabling communication between modules having differing communication protocols—such as a CAN protocol and LIN protocol.

Therefore, according to one embodiment of the invention, a communication bridge includes a first interface configured to interact with a first communication network that uses a first protocol, a second interface configured to interact with a second communication network that uses a second protocol, a first driver configured to operate the first interface, and a second driver configured to operate the second interface. The communication bridge further includes a first internal memory containing an address of each of one or more devices using the first communication network and a second internal memory containing an address of each of one or more devices using the second communication network. In addition, the communication bridge includes a first master application processor in operable communication with the first interface and the first internal memory and a second master application processor in operable communication with the second interface and the second internal memory. Further, when a message is received from a device on the first communication network for transmission to the second communication network, the first master application processor is programmed to associate the address of the device on the first communication network from which the message was received with the address of a device on the second communication network, so as to enable transmission of the message thereto. Moreover, when a message is received from a device on the second communication network for transmission to the first communication network, the second master application processor is programmed to associate the address of the device on the second communication network from which the message was received with the address of a device on the first communication network, so as to enable transmission of the message thereto.

According to another embodiment of the invention, a method for communicating between differing protocols includes receiving a first message at a communication bridge from a first address in a first communication network, the first address being associated with a device on the first communication network and changing the format of a data package from the first message from a first format of the first communication network to a bridge format of the communication bridge. The method further includes associating the first address of the first communication network with a second address in a second communication network, the second address being associated with a device on the second communication network. In addition, the method includes changing the format of the data package from the bridge format of the communication bridge to a second format of the second communication network and sending a second message with the data package to the second address of the second communication network using the second format.

According to yet another embodiment of the invention, a motor vehicle computer network system includes one or more modules connected to a first communication bus and using a first network protocol and one or more modules connected to a second communication bus and using a second network protocol, wherein the second network protocol is different than the first network protocol. In addition, the motor vehicle computer network system has a master bridge. The master bridge includes a first interface to interact with the one or more modules using the first network protocol, a second interface to interact with the one or more modules using the second network protocol, and one or more processors and associated memory devices in communication with the first and second interfaces. The one or more processors are programmed to receive a message from a module connected to one of the first communication bus or the second communication bus (the message including address information and a data package), determine an address of a module connected to the one of the first communication bus or the second communication bus from which the message was received, associate the address of the module from which the message was received to an address of a module connected to the other of the first communication bus or the second communication bus to which to send the data package in the received message, and transmit the data package from the received message to the determined address of the module connected to the other of the first communication bus or the second communication bus.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements no heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A communication bridge comprising:
   a first interface configured to interact with a first communication network that uses a first protocol;
   a second interface configured to interact with a second communication network that uses a second protocol;
   a first driver configured to operate the first interface;
   a second driver configured to operate the second interface;
   a first internal memory containing an address of each of one or more devices using the first communication network;
   a second internal memory containing an address of each of one or more devices using the second communication network;
   a first master application processor in operable communication with the first interface and the first internal memory;
   a second master application processor in operable communication with the second interface and the second internal memory;
   wherein, when a message is received from a device on the first communication network for transmission to the second communication network, the first master application processor is programmed to associate the address of the device on the first communication network from which the message was received with the address of a device on the second communication network, so as to enable transmission of the message thereto;
   wherein, when a message is received from a device on the second communication network for transmission to the first communication network, the second master application processor is programmed to associate the address of the device on the second communication network from which the message was received with the address of a device on the first communication network, so as to enable transmission of the message thereto;
   wherein the first interface converts data between a first format used by the first protocol and a bridge format used by the communication bridge; and
   wherein the second interface converts data between a second format used by the second protocol and a bridge format used by the communication bridge;
   wherein the first protocol is a Controller Area Network (CAN) protocol and the second protocol is a Local Interconnect Network (LIN) protocol;
   wherein the first master application processor is programmed to:
      receive an initial address message from the first communication network having a CAN protocol; and
      set-up an initial association between the addresses of each of the one or more devices using the first communication network and the addresses of each of the one or more devices using the second communication network; and
      wherein, in setting-up the initial association between the addresses of each of the one or more devices using the first communication network and the addresses of each of the one or more devices using the second communication network, the first master application processor is further programmed to generate a lookup table.

2. The communication bridge of claim 1 wherein the lookup table is accessible by the first master application processor and the second master application processor, such that the first master application processor and the second master application processor can associate addresses of messages between devices on the first and second communication networks.

3. A communication bridge comprising:
   a first interface configured to interact with a first communication network that uses a first protocol;
   a second interface configured to interact with a second communication network that uses a second protocol;
   a first driver configured to operate the first interface;
   a second driver configured to operate the second interface;

a first internal memory containing an address of each of one or more devices using the first communication network;

a second internal memory containing an address of each of one or more devices using the second communication network;

a first master application processor in operable communication with the first interface and the first internal memory;

a second master application processor in operable communication with the second interface and the second internal memory;

wherein, when a message is received from a device on the first communication network for transmission to the second communication network, the first master application processor is programmed to associate the address of the device on the first communication network from which the message was received with the address of a device on the second communication network, so as to enable transmission of the message thereto;

wherein, when a message is received from a device on the second communication network for transmission to the first communication network, the second master application processor is programmed to associate the address of the device on the second communication network from which the message was received with the address of a device on the first communication network, so as to enable transmission of the message thereto;

wherein the first interface converts data between a first format used by the first protocol and a bridge format used by the communication bridge;

wherein the second interface converts data between a second format used by the second protocol and a bridge format used by the communication bridge; and wherein, based on the conversion of data between the first format and the bridge format and between the second format and the bridge format, data can be directly sent between the first communication network and the second communication network.

4. A method for communicating between differing protocols, the method comprising:

receiving, at a communication bridge, a first message from a first address in a first communication network, the first address being associated with a device on the first communication network;

changing the format of a data package from the first message from a first format of the first communication network to a bridge format of the communication bridge;

associating the first address of the first communication network with a second address in a second communication network, the second address being associated with a device on the second communication network;

changing the format of the data package from the bridge format of the communication bridge to a second format of the second communication network; and sending a second message with the data package to the second address of the second communication network using the second format;

wherein associating the first address of the first communication network with the second address of the second communication network comprises a lookup table having stored thereon an association of addresses of devices on the first communication network with addresses of devices on the second communication network; and wherein the method further comprises:

receiving an initial address message from the first communication network having a CAN protocol;

setting-up an initial association between addresses of each of one or more devices on the first communication network and addresses of each of one or more devices on the second communication network; and setting up the lookup table based on the initial association between addresses of devices on the first communication network and addresses of devices on the second communication network.

5. The method of claim 4 wherein the first communication network is one of a Controller Area Network (CAN) bus and a Local Interconnect Network (LIN) bus and the second communication network is the other of a CAN bus and a LIN bus.

6. The method of claim 4 wherein, based on the changing of data between the first format and the bridge format and between the bridge format and the second format, data can be directly sent between the first communication network and the second communication network.

7. The method of claim 4 wherein associating the first address of the first communication network with the second address in the second communication network is performed by a first master application processor of the communication bridge.

8. A motor vehicle computer network system comprising:

one or more modules connected to a first communication bus and using a first network protocol;

one or more modules connected to a second communication bus and using a second network protocol, wherein the second network protocol is different than the first network protocol; and a master bridge comprising:

a first interface to interact with the one or more modules using the first network protocol;

a second interface to interact with the one or more modules using the second network protocol;

one or more processors and associated memory devices in communication with the first and second interfaces, with the one or more processors being programmed to:

receive a message from a module connected to one of the first communication bus or the second communication bus, the message comprising an address information and a data package;

determine an address of a module connected to the one of the first communication bus or the second communication bus from which the message was received;

associate the address of the module from which the message was received to an address of a module connected to the other of the first communication bus or the second communication bus to which to send the data package in the received message; and transmit the data package from the received message to the determined address of the module connected to the other of the first communication bus or the second communication bus;

wherein the first interface converts data between a first format used by the first protocol and a bridge format used by the master bridge; and wherein the second interface converts data between a second format used by the second protocol and a bridge format used by the master bridge wherein first network protocol is a Controller Area Network (CAN) protocol and the second network protocol is a Local Interconnect Network (LIN) protocol;

wherein the first master application processor is programmed to:
  receive an initial address message from the first communication bus having a CAN protocol; and
  set-up an association between the addresses of each of the one or more modules using the first network protocol and the addresses of each of the one or more devices using the second network protocol; and wherein the first master application processor is further programmed to generate a lookup table based on the initial association between the addresses of each of the one or more modules using the first network protocol and the addresses of each of the one or more modules using the second network protocol.

9. The system of claim 8 wherein the one or more processors and associated memory devices comprises:
  a first internal memory storing an address of each of the one or more modules using the first network protocol;
  a first master application processor in operable communication with the first interface and the first internal memory; and
  a control application comprising a second master application and a second internal memory storing an address of each of the one or more modules using the second network protocol;
  wherein the address of each of the one or more modules using the first network protocol stored on the first internal memory is associated with the address of each of the one or more modules using the second network protocol stored on the second internal memory.

10. The system of claim 8 wherein, in associating the address of the module from which the message was received to an address of a module connected to the other of the first communication bus or the second communication bus to which to send the data package in the received message, the one or more processors are programmed to access the lookup table to determine such an association.

11. The system of claim 8 wherein the master bridge allows the one or more modules using the first network protocol to directly communicate with the one or more modules using the second network protocol; and
  wherein the first network protocol and the second network protocol are different.

* * * * *